J. V. PUGH.
DETACHABLE WHEEL.
APPLICATION FILED SEPT. 7, 1912.
1,296,007.
Patented Mar. 4, 1919.
3 SHEETS—SHEET 2.
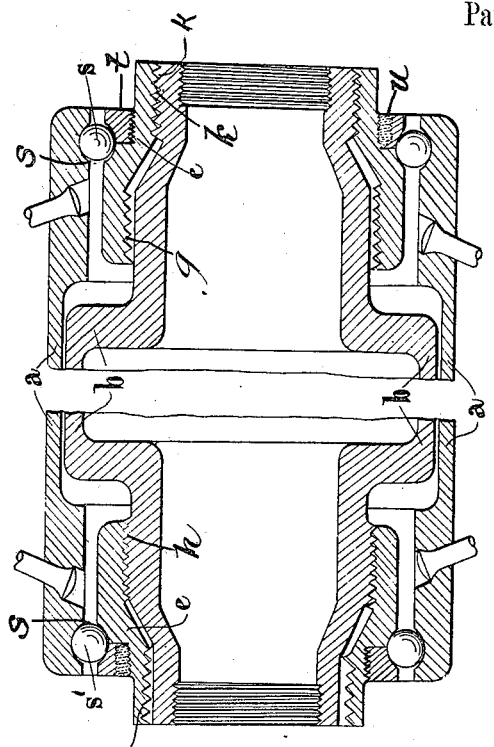
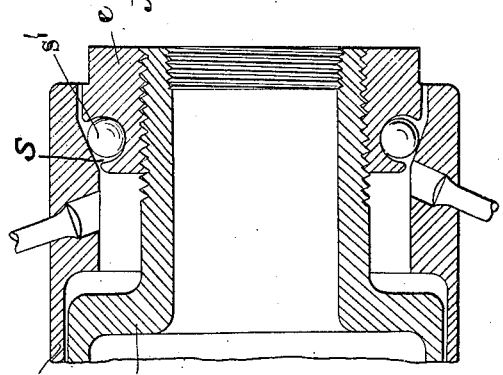
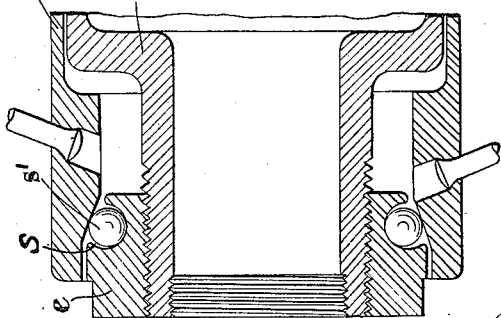
Witnesses
C E Parsons
H L Alden
Inventor
John V Pugh
By Spear, Middleton, Donaldson & Spear
Attorney

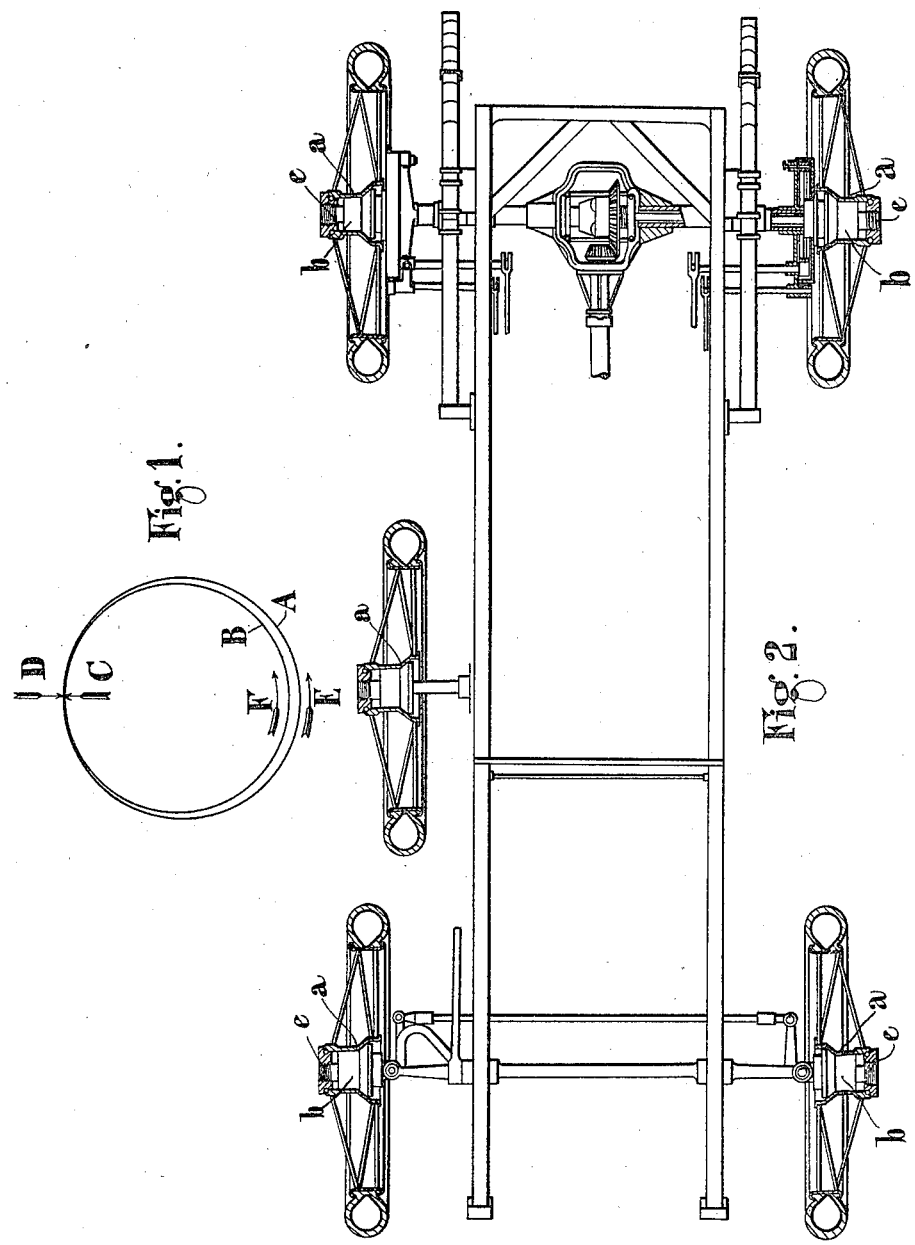

J. V. PUGH.
DETACHABLE WHEEL.
APPLICATION FILED SEPT. 7, 1912.

1,296,007.

Patented Mar. 4, 1919.
3 SHEETS—SHEET 3.

Witnesses.
C E Parsons
H. L. Alden

Inventor.
John V. Pugh
By Spear, Middleton, Donaldson & Spear
Attorney

UNITED STATES PATENT OFFICE.

JOHN VERNON PUGH, OF COVENTRY, ENGLAND, ASSIGNOR, BY MESNE ASSIGNMENTS, TO WIRE WHEEL CORPORATION OF AMERICA, A CORPORATION OF NEW YORK.

DETACHABLE WHEEL.

1,296,007. Specification of Letters Patent. Patented Mar. 4, 1919.

Application filed September 7, 1912. Serial No. 719,207.

*To all whom it may concern:*

Be it known that I, JOHN VERNON PUGH, a subject of the King of Great Britain and Ireland, and residing at Guiting House, Allesley, Coventry, in the county of Warwick, England, have invented certain new and useful Improvements in and Relating to Detachable Wheels, of which the following is a specification.

This invention relates to detachable vehicle wheels of the type in which an outer detachable hub part is mounted non-rotationally on an inner permanent hub part (*i. e.* so that the two parts revolve as one), and is held thereon by means of a nut or equivalent screwed securing device.

The object of the invention is to render the secure locking of this nut or screwed securing device which holds the outer upon the inner hub part independent of the action of the ratchets or other additional locking devices, which have hitherto been regarded as essential in practice to insure safety.

It is well known that if two solids of revolution *e. g.* cylinders, cones, screw-threaded cylinders or the like are put together one inside the other the inner one must be smaller than the outer one, and consequently must be of shorter circumference. If the two parts are kept in contact at one fixed point and substantially out of contact at the diametrically opposite fixed point, and either of the two parts be revolved, under conditions which do not involve slip, then the other part will revolve also, and the speeds of revolution of the two parts is proportional inversely to the relative lengths of their circumferences, the inner part revolving faster than the outer part.

The two hub parts of a wheel of the type hereinbefore indicated are connected with one another so that they must rotate together and the clearance between them required to insure easy attachment and removal of the detachable part is such that when loaded the one hub part may be considered to be slightly eccentric to the other. The nut or securing device is arranged when screwed up to center the outer end and to transmit a portion of the load from the inner to the outer hub part, and a coned or tapered centering abutment is preferably provided conveniently at the inner end of the hub.

The above transmission of load produces during forward rotation of the wheels the conditions necessary for the already described principle to come into action, and thus the frictional contact of the suitable coacting surfaces causes the nut or securing device to screw up and consequently to retain the detchable outer hub part in position.

According to this invention I provide that the rotative effect of the two contacts of the inner and outer hub parts respectively with the nut or like screw threaded device will be different both in direction and in magnitude, but by the employment of means for reducing the friction between the nut and one of the hub parts I insure that the difference will be such that the resultant effect of the contacts will be to tighten up the nut or like screw threaded device during the forward movement of the vehicle and to retain the outer hub part upon the inner hub part and render the employment of ratchets or other additional locking devices unnecessary.

Referring now to the accompanying drawings:—

Figure 1 is a diagram illustrating the principle upon which the invention is based.

Fig. 2 is a plan of a motor vehicle to which detachable wheels constructed in accordance with this invention are applied, the vehicle carrying a spare outer hub part.

Figs. 3, 4 and 5 show various arrangements for carrying the invention into effect, the outside ends of a pair of wheel hubs for use on opposite sides of a vehicle being illustrated in each figure.

Figure 5:
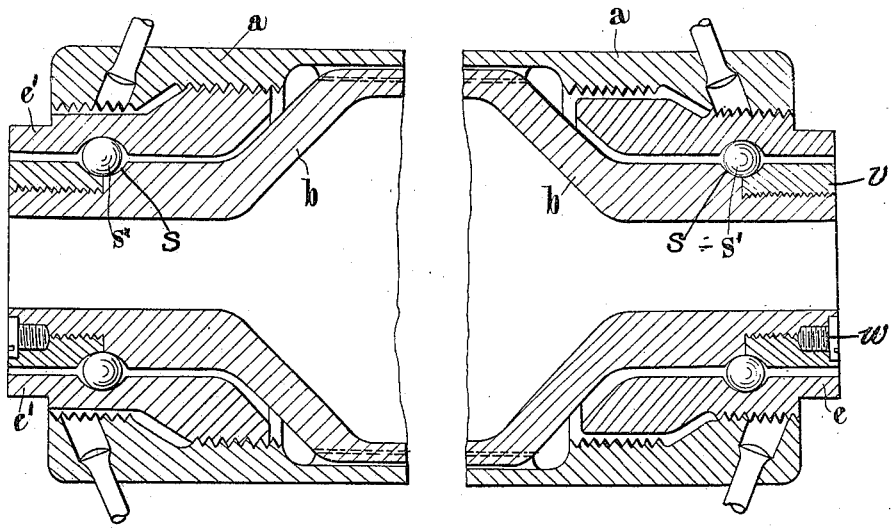

In Fig. 1 the circles A—B represent the cross section of two solids of revolution fitting the one within the other, the necessary clearance being exaggerated for the sake of clearness. If these two bodies are pressed together in a vertical direction as indicated by the arrows C—D, and the one A is revolved in the direction of the arrow E, then the other B will be driven by it and will revolve as indicated by the arrow F, but at a higher speed of revolution in the ratio of the diameter A to the diameter B.

When applying the foregoing to a detachable wheel hub construction, the nut part which is provided with circumferential engaging surfaces forming solids of revolution has each pressed by the weight of the car tightly in contact with one of two other solids of revolution in the shape of the engaging surfaces of the inner and outer hub parts, the two former having of necessity the same angular velocity when revolving. The nut part will during joint revolution of the parts tend to move forward or backward relative to either one of the two hub parts according to whether it is in contact with an internally disposed or an externally disposed circumferential engaging surface thereof, so that if it engages a similarly disposed surface of each hub part its motion is the result of the sum of the frictional driving effects of both. If, on the other hand, a nut part is formed to be in contact with an internally disposed surface of one hub part and an externally disposed surface of the other, then the two frictional driving effects will be opposed to one another and the motion of the nut part is the result of their difference. According to a third alternative, the frictional driving effect of one of the hub parts may be practically eliminated by arranging friction reducing means between its circumferential engaging surface and the corresponding engaging surface of the nut part.

The present application describes only cases of the third type in which by the insertion of friction reducing means between the nut part and the circumferential engaging surface of one of the hub parts the nut is subjected practically only to the frictional driving effect of the other hub part. The other cases are described in applications Serial Nos. 681760 and 710481.

In carrying this invention into effect as shown by way of example in Fig. 3, a ball race, $s$, is introduced between the nut, $e$, and the detachable hub part, $a$, the ball $s'$ being kept in the race by cages (not shown in the drawing) or in any other suitable manner. In this case for a wheel on the left hand side of the vehicle, the nut would screw on to a right-handed screw thread, $c$, on the fixed or inner hub part, $b$, and on the right hand side of the vehicle the nut would screw on to a left handed screw thread. As the ball race is practically frictionless, the tendency to revolve will be that due to the contact between the nut and the inner hub part. The nut will revolve more slowly than the inner hub part and consequently will tend to rotate relative to the hub parts in the direction to tighten it up during the forward movement of the vehicle.

As shown in Fig. 4, a ball race, $s$, is provided between the nut, $e$, and the outer hub part, $a$, so arranged that it acts to retain the former in connection with the latter. Portions of internal screw threads one left handed $f$ and one right handed $g$ are provided, these being of different diameter. The inner hub part on the left hand side of the vehicle would be formed with an external thread $h$ to engage the right hand thread $g$ of the nut, and the inner hub part on the right hand side of the vehicle would be provided with an external left hand thread $k$ to engage the left hand thread $f$ of the nut.

The balls $s'$ are held in the race by means of a locking ring $t$ which forms a part of the race way. This locking ring is screw-threaded onto the nut $e$ and is held in place by any suitable means, a screw $v$ being shown in the drawing. By this construction the nut is secured to the outer hub part and is removable therewith. In order to remove the nut from the outer hub part the locking ring ($t$) must be taken off releasing the balls which are next removed and the nut is then detached. Thereby there is provided a frictionless means, which permits the rotation of the nut on the outer hub part but prevents any separating movement therebetween. Since the nut and outer hub part are so connected the tightening or loosening of the nut forces the outer hub part on or off the inner hub part.

As shown in Fig. 5, the detachable hub part, $a$, is provided with portions of internal right and left handed threads, and the nut, $e'$, with corresponding left-hand thread, and the nut, $e$, with right hand thread, the two nuts being used on opposite sides of the vehicle. The ball race, $s$, is situated between the nut and the inner hub part, and the balls $s'$ are held in place by a locking ring $v$ which forms a part of the race. The ring $v$ is screw threaded onto the inner hub part $b$ and is held in position by any suitable means $w$. The nut $e$ is thus held on the inner hub $b$ although permitted to rotate relatively thereon by reason of the balls $s'$ and hence when the nut is turned relatively to the outer hub part that part is forced to move relatively to the inner hub part, while the nut retains its position upon the inner hub part.

It will be seen that by the use of this invention it can be arranged that a spare outer hub part which is interchangeable with a like detachable outer hub part of a vehicle wheel is automatically and safely retained in position as soon as the nut has been screwed up, and that no spring or hand operated pawls or catches with the attendant ratchet teeth or castellations are necessary to prevent the nut from working loose, and as the tightening is automatic, there is no possibility of the outer hub part remaining loose upon the inner hub part through insufficient tightening of the nut, and undue wear of the driving members is thus avoided.

Further, any ordinary spanner of the correct size may be used for the nut and no special pawl releasing devices are required. The spanner may also be instantly applied to the nut for tightening or unscrewing without the previous manipulation of any catches or pawls.

It will be observed that in this specification the expressions "detachable vehicle wheel" and "wheel" indicate an entity comprising permanent inner hub part, removable outer hub part and a nut or like screw threaded securing device.

It will be seen that the above described modifications are merely examples of methods of carrying out the invention and that many other modifications may be employed.

Having now described my invention what I claim as new and desire to secure by Letters Patent is:—

1. In combination in a detachable wheel, two hub parts sleeved and engaged to revolve together, but subject to slight eccentric displacement, an internal circumferential surface to one part, an external circumferential surface to the other part, a nut having anti-friction roller means engaging one surface, and transmitting radial force from one surface to the other, while retaining the parts in connection, whereby due to eccentricity it rotates relative to said parts during revolution of the wheel, and screw threads on the other surface engaged by said nut so handed that during forward movement tightening results from the relative rotation.

2. In combination in a detachable wheel, two hub parts sleeved and engaged to revolve together, but subject to slight eccentric displacement, an internal circumferential surface to one part, an external circumferential surface to the other part, said surfaces forming the circumferential boundaries of an annular space between said parts, a nut in said annular space connected by anti-friction roller means to one part and transmitting radial force to the surface of the other part, whereby due to eccentricity said nut rotates relative to said parts during revolution of the wheel, and screw threads on the surface of said other part engaged by said nut and so handed that during forward movement tightening results from the relative rotation.

3. In combination in a detachable wheel, two hub parts sleeved and engaged to revolve together, but subject to slight eccentric displacement, an internal circumferential surface to the outer part, an external circumferential surface to the inner part, a nut having anti-friction roller means for engaging one surface, and transmitting radial force therefrom to the surface of the inner part, while retaining the parts in connection, whereby due to eccentricity said nut rotates relative to said parts during revolution of the wheel, and screw threads on the surface of said inner part which are right hand for a wheel for the left side of a vehicle and left hand for one for the right side so that during forward movement tightening results from the relative rotation.

4. In combination an inner hub part of a detachable wheel for the right side of a vehicle, an outer part sleeved on said inner part, means insuring simultaneous revolution of said parts but permitting eccentricity of their axes, an internal circumferential surface to one of said parts, an external surface to the other, at least one of said surfaces being screw-threaded, a nut part threaded to said screwed surface and having anti-friction engagement with said other surface whereby it transmits radial forces while retaining one part upon the other and due to eccentricity rotates relative to said parts during revolution of the wheel, and three wheel parts for the left side of a vehicle equivalent to the aforesaid but the nut having screw threads of opposite hand to those of said right hand nut so that the relative rotation upon forward movement of a vehicle tightens the nut upon each side.

5. In combination an inner hub part of a detachable wheel, an outer part sleeved on said inner part, means insuring simultaneous revolution of said parts but permitting eccentricity of their axes, a circumferential surface to each of said parts, said surfaces being of opposite radial disposition and at least one being screw threaded, an annular nut part positioned between said surfaces and engaging said threads, whereby it transmits radial forces while retaining one part upon the other, and is subjected to oppositely directed turning moments imposed by said parts due to revolution of the wheel, and anti-friction means transmitting the radial force from said nut part to one hub part and thereby causing the moment of the threaded part to predominate the other moment so that due to eccentricity said nut is tightened up during forward movement.

6. In a detachable wheel, the combination of an inner hub part, an outer hub part mounted on said inner hub part, means insuring the simultaneous rotation of said parts while permitting eccentricity of their axes, a nut screw threaded into engagement with one of said hub parts, and antifriction means between said nut and said other hub part permitting the relative rotation of said nut and other hub part while preventing the longitudinal separation thereof, whereby the nut is tightened upon the forward movement of the wheel.

7. In a detachable wheel, the combination of an inner hub part, an outer hub part mounted on said inner hub part, means insuring the simultaneous rotation of said parts while permitting eccentricity of their axes, a nut screw threaded into engagement with one of said hub parts, a ball race between said nut and said other hub part permitting the relative rotation of said nut and other hub part while preventing the longitudinal separation thereof, whereby the nut is tightened upon the forward movement of the wheel.

8. In a detachable wheel, the combination of an inner hub part, an outer hub part mounted on said inner hub part, means insuring the simultaneous rotation of said parts while permitting eccentricity of their axes, a nut screw threaded into engagement with one of said hub parts, a ball race between said nut and said other hub part permitting the relative rotation of said nut and other hub part while preventing the longitudinal separation thereof, and a locking ring forming part of said race and securing it to said hub part, whereby the nut is tightened upon the forward movement of the wheel.

9. In a detachable wheel the combination of an inner hub part, an outer hub part, mounted on said inner hub part, means insuring simultaneous rotation of said part, and a nut screw threaded into engagement with one of said hub parts and having a line contact with the other of said hub part, a ball race between said nut and said other hub part permitting the relative rotation of said nut and other hub part while preventing the longitudinal separation thereof, and a locking ring forming part of said race and securing it to said hub part, whereby the nut is tightened upon the forward movement of the wheel.

10. In a detachable wheel, the combination of an inner hub part, an outer hub part mounted on said inner hub part, means insuring the simultaneous rotation of said parts, a nut screw threaded on to the inner hub part and balls between said nut and outer hub part to provide a line contact therebetween.

11. In a detachable wheel, the combination of an inner hub part, an outer hub part mounted thereon, means insuring the simultaneous rotation of said parts, a nut screw threaded onto said inner hub part within the mouth of the outer hub part, and balls between said nut and said outer hub part to provide a series of points of contact therebetween.

In testimony whereof, I affix my signature in presence of two witnesses.

JOHN VERNON PUGH.

Witnesses:
   Thomas H. West,
   Bertram H. Matthews.